(12) United States Patent
Sato et al.

(10) Patent No.: US 8,412,014 B2
(45) Date of Patent: Apr. 2, 2013

(54) OPTICAL FIBER RIBBON CAPABLE OF BRANCHING AND METHOD FOR MAKING FIBER RIBBON BRANCH

(75) Inventors: Yukiko Sato, Chiba (JP); Keiko Sano, Katori (JP); Naoki Okada, Yotsukaido (JP)

(73) Assignee: Fujikura Ltd., Tokyo (JP)

( * ) Notice: Subject to any disclaimer, the term of this patent is extended or adjusted under 35 U.S.C. 154(b) by 262 days.

(21) Appl. No.: 12/811,978

(22) PCT Filed: Dec. 25, 2008

(86) PCT No.: PCT/JP2008/073594
§ 371 (c)(1),
(2), (4) Date: Aug. 10, 2010

(87) PCT Pub. No.: WO2009/087911
PCT Pub. Date: Jul. 16, 2009

(65) Prior Publication Data
US 2010/0296781 A1    Nov. 25, 2010

(30) Foreign Application Priority Data
Jan. 8, 2008   (JP) ................................ P2008-001278

(51) Int. Cl.
*G02B 6/44*   (2006.01)
(52) U.S. Cl. ........................................ 385/114; 385/100
(58) Field of Classification Search .......... 385/100–114; 65/385, 408
See application file for complete search history.

(56) References Cited

FOREIGN PATENT DOCUMENTS

| JP | 59-22404 U | 2/1984 |
|----|----|----|
| JP | 01-138516 A | 5/1989 |
| JP | 02-046411 A | 2/1990 |
| JP | 03-045287 A | 2/1991 |
| JP | 09-080297 A | 3/1997 |
| JP | 11-183768 A | 7/1999 |
| JP | 2003-279756 A | 10/2003 |
| JP | 2005-062427 A | 3/2005 |
| JP | 2005-249977 A | 9/2005 |
| JP | 2005-292518 A | 10/2005 |
| JP | 2005-352510 A | 12/2005 |
| JP | 2006-030684 A | 2/2006 |
| JP | 2006-267275 A | 10/2006 |

OTHER PUBLICATIONS

Communication, dated Sep. 22, 2011, issued by the State Intellectual Property Office of P.R. China in corresponding Chinese Application No. 200880124357.3.
Office Action issued by the Chinese Patent Office in Chinese Application No. 200880124357.3 dated Jul. 5, 2012.
Office Action issued by the Indonesian Patent Office in Indonesian Patent Application No. W-00201002630 dated Jun. 1, 2012.
Office Action issued by the Japanese Patent Office in Japanese Application No. 2008-001278 dated Jun. 5, 2012.

*Primary Examiner* — Brian Healy
*Assistant Examiner* — Hung Lam
(74) *Attorney, Agent, or Firm* — Sughrue Mion, PLLC

(57) ABSTRACT

An optical fiber ribbon is capable of branching by means of any tool. The optical fiber ribbon is comprised of a plurality of optical fibers running in parallel, each of the optical fibers having an allowable radius of curvature; a blanket sheath totally covering the plurality of the optical fibers; one or more concavities formed at any one or more intermediates among the optical fibers; and slits respectively arranged in series at a regular interval along the concavities, the slits penetrating the blanket sheath and allowing the tool to be inserted and the blanket sheath to split by means of movement of the tool along the concavities. The length of each slit prior to insertion of the tool is so determined that flexures of the optical fibers induced by the tool widening the slits do not exceed the allowable radius of curvature.

3 Claims, 2 Drawing Sheets

OPTICAL FIBER RIBBON CAPABLE OF BRANCHING AND METHOD FOR MAKING FIBER RIBBON BRANCH

CROSS REFERENCE TO RELATED APPLICATIONS

This application is a National Stage of International Application No. PCT/JP2008/073594 filed Dec. 25, 2008, claiming priority from Japanese Patent Application No. 2008-001278, filed Jan.8, 2008, the contents of all of which are incorporated herein by reference in their entirety.

TECHNICAL FIELD

The present invention relates to an optical fiber ribbon capable of branching and a method for making the ribbon branch.

BACKGROUND ART

For the purpose of establishing plural separate optical communications, optical fiber ribbons each of which has a plurality of optical fibers bundled in a tape-like shape have been available for these years. A plurality of such optical fiber ribbons are further bundled and the whole of them is covered with a sheath, thereby a single optical fiber cable is structured and then laid down. Such an optical fiber cable after being laid may be in some cases subject to a work referred to as "intermediate post-branching" in which one or more cores are drawn out and linked with another optical fiber cable. In carrying out the intermediate post-branching, first it is required that the sheath of the ribbons is split for the purpose of drawing out one or more cores and then each optical fiber ribbon is made to branch. This work usually requires specialized tools.

At a time of implementation of the intermediate post-branching, the sheath is split and thus a bend is given to the optical fiber, thereby transmission loss sometimes increases. In a case where the subject optical fiber ribbon includes an optical fiber just being used for communication, namely a "hot line" optical fiber, it is very important to prevent increase in transmission loss induced by bending.

Related arts are disclosed in Japanese Patent Applications Laid-open No. H09-80297, 2005-62427, 2005-292518, H01-138516, 2005-352510 and 2006-030684, and Utility Model Application Laid-open No. S59-22404.

DISCLOSURE OF INVENTION

The present invention has an object to provide an optical fiber ribbon which are readily made to branch by means of versatile tools with suppressing transmission loss induced by bending, and a method for making the optical fiber ribbon branch.

In accordance with a first aspect of the present invention, an optical fiber ribbon capable of branching by means of a tool having a width (X) is comprised of: a plurality of optical fibers running in parallel, each of the optical fibers having an allowable radius of curvature; a blanket sheath totally covering the plurality of the optical fibers; one or more concavities formed at any one or more intermediates among the optical fibers; and slits respectively arranged in series at a regular interval along the concavities, the slits penetrating the blanket sheath and allowing the tool to be inserted and the blanket sheath to split by means of movement of the tool along the concavities, each of the slits having a length prior to insertion of the tool so determined that flexures of the optical fibers induced by the tool widening the slits do not exceed the allowable radius of curvature.

Preferably, each of the optical fibers has an outer diameter (D), the blanket sheath has a thickness (t1) from the respective optical fibers to a surface, each of the concavities has a thickness (t2), and a length (A), the allowable radius of curvature (R), and the intervals (B) satisfy: Y<A<500 mm, Y<A+B<500 mm, 0.01<A/(A+B)<1, 0<t2 <D+2t1, and $$Y = 2\sqrt{R^2 - \left\{R - \left(\frac{X}{2}\right)\right\}^2},$$

wherein Y is a lower limit length of the slits.

Alternatively preferably, each of the optical fibers has an outer diameter (D), the blanket sheath has a thickness (t1) from the respective optical fibers to a surface, each of the concavities has a thickness (t2), and a length (A), and the intervals (B) satisfy: Y<A<500 mm, Y <A+B<500 mm, 0.01<A/(A+B)<1, 0<t2<D+2t1 , and $$Y = 2\sqrt{30^2 - \left\{30 - \left(\frac{X}{2}\right)\right\}^2},$$

wherein Y is a lower limit length of the slits.

Alternatively still preferably, the thickness (t1) satisfies 0<t1≦0.025 mm.

In accordance with a second aspect of the present invention, a method for making an optical fiber ribbon branch, the optical fiber ribbon comprising a plurality of optical fibers running in parallel, each of the optical fibers having an allowable radius of curvature; a blanket sheath totally covering the plurality of the optical fibers; one or more concavities formed at any one or more intermediates among the optical fibers; and slits penetrating the blanket sheath, is comprised of: inserting a tool having a width so determined that flexures of the optical fibers induced by the tool widening the slits do not exceed the allowable radius of curvature into one selected from the slits; and moving the tool along the concavities to split the blanket sheath.

BEST MODE FOR CARRYING OUT THE INVENTION

Figure 2:
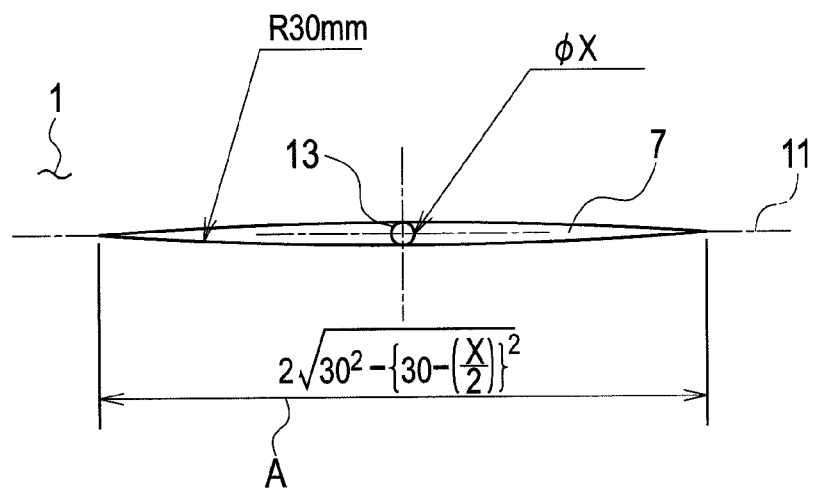
FIG. 2 is a conceptual drawing showing a state where a slit in the optical fiber ribbon is widened.
Figure 3:
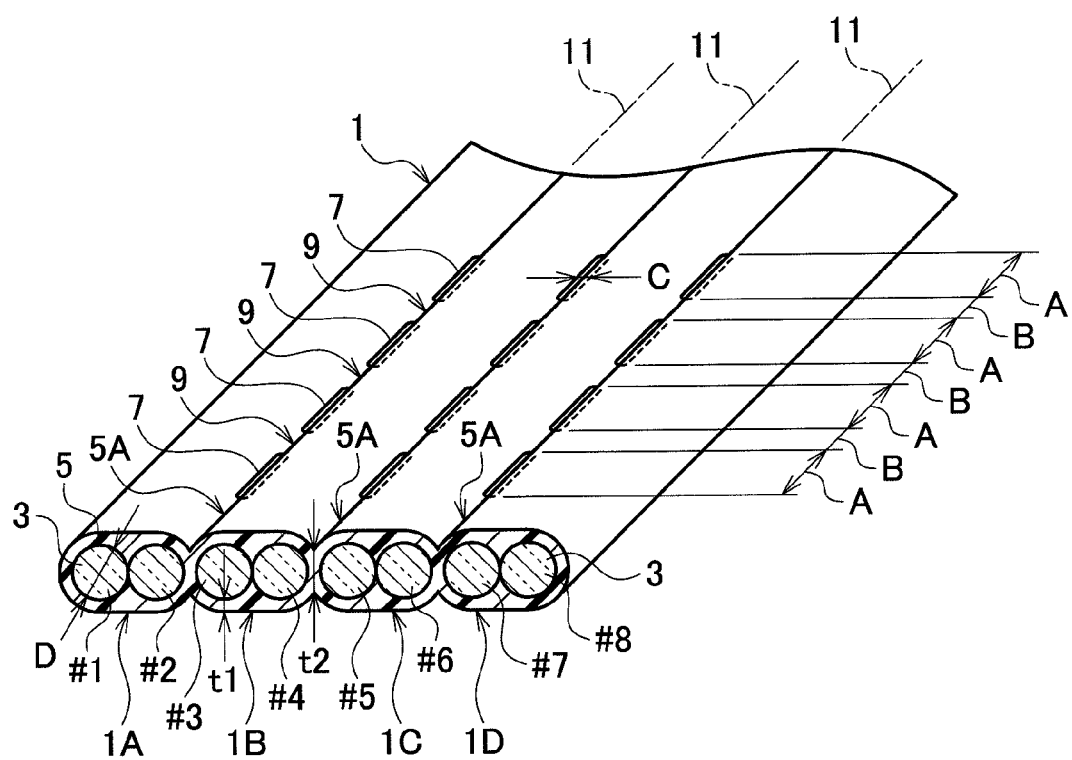
FIG. 3 is a perspective view of an optical fiber ribbon according to an alternative embodiment of the present invention, which shows a cross section in part.

Exemplary embodiments of the present invention will be described hereinafter with reference to FIGS. 1 through 3.

Figure 1:
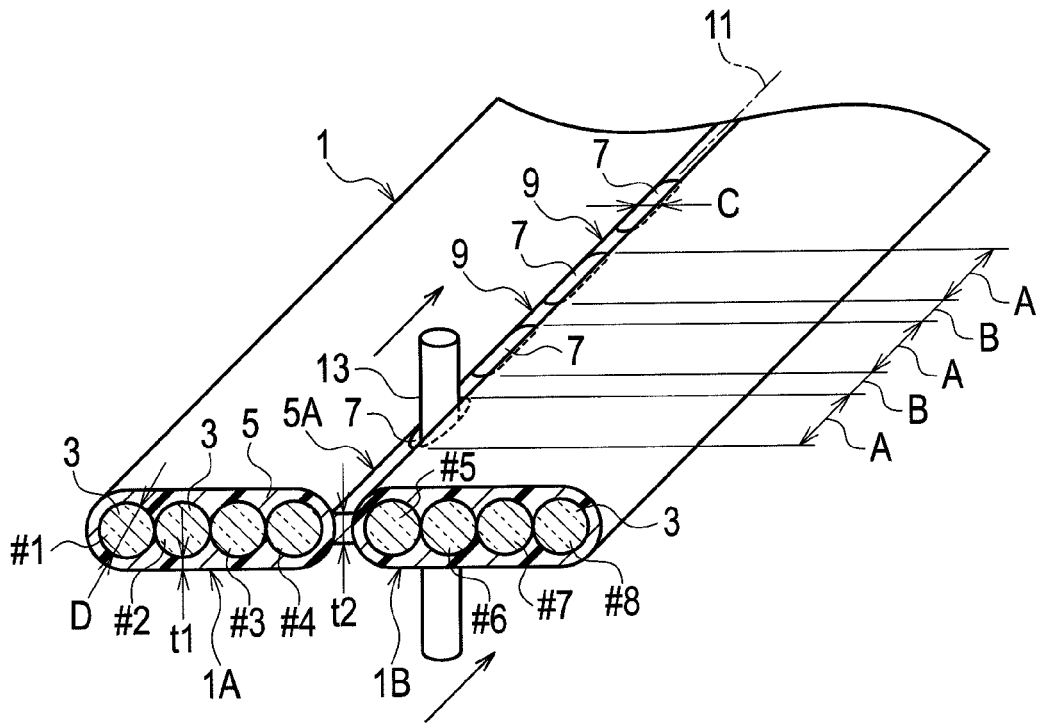
FIG. 1 is a perspective view of an optical fiber ribbon according to an embodiment of the present invention, which shows a cross section thereof in part.

Referring to FIG. 1, an optical fiber ribbon 1 in accordance with an embodiment includes a plurality of optical fibers 3 running in parallel. Each of the optical fibers 3 may be either a bare fiber or a fiber cord, and the whole of them is covered with a blanket sheath 5 so as to form a tape. As the optical fibers 3 form a single layer, the optical fiber ribbon 1 is relatively thin and therefore preferably applicable to space-saving uses. Of course, the optical fibers 3 may be made to form a plurality of layers. Further, for the purpose of distinction of the optical fibers 3, these surfaces or any faces may be colored.

On the blanket sheath 5, at any one or more intermediates among optical fibers 3, concavities 5A are formed. Each of the concavities 5A is formed over the entire length in its longitudinal direction of the blanket sheath 5. Respectively along the concavities 5A, slits 7 are formed. The slits 7 are arranged in series at regular intervals B along the concavities and penetrate the blanket sheath 5 in its thickness direction so as to allow a tool 13 to be inserted therein. Each of the concavities 5A may have a neck portion substantially parallel to its bottom portion.

While the slits 7 give structural separation between partial ribbons 1A, 1B from the outset, portions 9 which are the concavities 5A but the slits 7 establish junction between the partial ribbons 1A, 1B.

In the embodiment shown in FIG. 1, an optical fiber ribbon 1 contains eight optical fibers 3. When numbers #1 through #8 are attached to these optical fibers 3 one by one from one end thereof, a concavity 5A is formed in an intermediate between the #4 optical fiber 3 and the #5 optical fiber 3. By using this concavity 5A and the slits 7 formed along the concavity 5A, the blanket sheath 5 can split so that the optical fiber ribbon 1 can be divided into a partial ribbon 1A including the #1 through #4 optical fibers 3 and a partial ribbon 1B including the #5 through #8 optical fibers 3.

FIG. 1 exemplarily shows that the #4 and #5 optical fibers 3 are to some extent apart from each other. Although such a structure is preferable in view of easiness of forming the slits 7 and suppression of curvature of the optical fibers 3, the #4 and #5 optical fibers 3 may be modified to mutually adjoin. Further, the number of the optical fibers 3, and the position and the number of the concavities 5A are also not limited to those described above.

The work of separating the optical fiber ribbon 1 can be executed without any tool, however, any proper tool 13 may be used for the purpose of preventing the optical fiber 3 from bending. As the tool 13, any versatile member such as a wire rod having a round, or somehow differently shaped, cross section. The tool 13 is inserted into any of the slits 7 and then moved along the concavity 5A, thereby splitting the blanket sheath 5 along a splitting line 11 and then separating the optical fiber ribbon 1.

When the tool 13 is inserted into one of the slits 7, the radius of curvature of the related optical fiber 3 decreases (flexure thereof increases). If the radius of curvature falls below an allowable radius of curvature, the transmission loss increases to exceed an allowable limit. Thus the slit 7 is so dimensioned that the radius of curvature of the optical fiber resulting from widening of the slit by the tool 13 is kept larger than the allowable radius of curvature as described hereinafter. More specifically, as exemplarily shown in FIG. 2, the tool 13 inserted into one of the slit 7 widens the slit 7 so that flexure is induced on one of the optical fiber 3 adjacent to the slit 7 at issue. As this flexure can be approximated by an arc, when a radius of curvature by this flexure is r, a width of the tool 13 (or a diameter if its cross section is round) is X, and a length of the slit 7 prior to insertion of the tool 13 is A, a relation among them is represented by the following equation.

$$A = 2\sqrt{r^2 - \left\{r - \left(\frac{X}{2}\right)\right\}^2}$$

Therefore, to prevent the radius of curvature r from falling below the allowable radius of curvature R, the length A of the slit 7 can be determined on the basis of the following inequality.

$$A \geq Y = 2\sqrt{R^2 - \left\{R - \left(\frac{X}{2}\right)\right\}^2}$$

Here, Y represents a lower limit of the length of the slit 7 so as not to fall below the allowable radius of curvature R. As the allowable radius of curvature R is typically 30 mm for instance, the length A of the slit 7 can be determined on the basis of the following inequality. (see FIG. 2)

$$A \geq Y = 2\sqrt{30^2 - \left\{30 - \left(\frac{X}{2}\right)\right\}^2}$$

Then the radius of curvature of the optical fiber 3 is assured to be larger than 30 mm that is the allowable radius of curvature, therefore increase in transmission loss of the optical fiber led from separation of the optical fiber ribbon 1 can be sufficiently suppressed.

At a time of intermediate branching of an optical fiber cable such as an SZ-type optical fiber cable, it is required to peel off a sheath of the cable over the length of 500 mm. The concavity 5A preferably has at least one junction portion 9 (a portion not a slit 7 in the concavity 5A).

Taking the aforementioned matters into consideration, provided that a lower limit length of the list 7 is Y, the length A of the slit 7 preferably satisfies the following inequalities.

$$Y \leq A < 500 \text{ mm},$$
$$Y < A + B \leq 500 \text{ mm},$$
$$0.01 \leq A/(A+B) < 1,$$
$$Y = 2\sqrt{30^2 - \left\{30 - \left(\frac{X}{2}\right)\right\}^2}, \text{ and}$$

Further, when a thickness of the blanket sheath 5 from the optical fiber 3 to a surface thereof is t1 and a thickness of the concavity 5A is t2, t2 is preferably within a range of 0<t2<D+2t1. As being capable of splitting with a relatively small force, the concavity 5A structured in this way effectively prevents application of an excessive force to the optical fiber 3. More specifically, as flexure of the optical fiber 3 is suppressed, increase in transmission loss is suppressed.

Although in the above arguments a wire rod having a round cross section is exemplified as the tool 13, of course any tools of various shapes such as a sheet or a square pillar having a width X can be used.

As being understood from the above explanation, the number of optical fibers is arbitrary in the present embodiment of the present invention and a concavity including slits may be formed at any intermediate between any pair of the optical fibers. Further the number of concavities is also arbitrary. Further the shape of the concavity may be formed in a shape having a roughly V-shaped cross section instead of the shape shown in FIG. 1. As an example in such a structure, an embodiment shown in FIG. 3 is possible. In the embodiment shown in FIG. 3, as each gap between adjacent optical fibers having a concavity is made as narrow as possible, the concavity is necessarily roughly V-shaped. Such an optical fiber ribbon 1 including a plurality of optical fibers 3 is made to branch into a plurality of ribbons 1A, 1B, 1C . . . each including a smaller number of optical fibers 3.

Further, if the thickness t1 from the optical fiber 3 to the surface of the blanket sheath 5 is in a range of 0<t1≦0.025 mm, the plurality of ribbons 1A, 1B, 1C . . . each including a smaller number of optical fibers 3 are readily respectively made to branch into ribbons each including a single optical fiber 3. Still further, instead of the versatile tool, a tool for shearing disclosed in Japanese Patent Application Laid-open No. 2006-030684, or a tool for realizing branching by means of a projection disclosed in 2006-030684, may be used for instance.

To demonstrate effects served by the aforementioned embodiments, the following measurements have been carried out. More specifically, an optical fiber ribbon 1 containing eight optical fibers 3 shown in FIG. 1 has been produced, separated into optical fiber ribbons 1A, 1B each containing four of the optical fibers 3, and further respectively separated into optical fiber ribbons each including only one of the optical fibers 3, and then change of transmission loss is measured at each occasion of separation. A concavity 5A is formed at an intermediate between a #4 optical fiber and a #5 optical fiber, and slits 7 are formed to be arranged in series at regular intervals B along the concavity 5A.

Here, a single-mode optical fiber (SMF) regulated in JIS-C6835 or ITUT-G652 and an SR10 optical fiber in conformity to ITUT-G652B are applied to the optical fiber 3. An optical fiber of an SR10 equivalence is an optical fiber that has transmission of 0.50 dB or less in regard to light of 1.550 μm in wavelength when the fiber is bent to make 10 turns with a bending diameter Φ of 20 mm.

The length A of the slit 7 is 72 mm and the interval B is 8 mm. More specifically, A+B is 80 mm and A/(A+B) is 0.9. Given that a wire rod of 0.2 mm in diameter is used as a tool, the aforementioned condition in which $Y \leq A < 500$ mm, $Y < A+B \leq 500$ mm, and $0.01 \leq A/(A+B) < 1$, is satisfied.

Table 1 summarizes measurement results in which transmission loss change in a case where the optical fiber ribbon 1 is separated into two optical fiber ribbons 1A, 1B is measured. Table 1 shows two cases, one is related to a case where a wire rod of 0.2 mm in diameter is used and another is related to a case where a tool by shearing is used.

TABLE 1

Loss change at a time of separation
8 cores -> 4 cores

| TYPE OF OPTICAL FIBER APPLIED TO RIBBON | TOOL FOR SEPARATION | |
|---|---|---|
| | TOOL USING WIRE ROD | TOOL BY SHEARING |
| SMF | ○ | ○ |
| SR10 equivalence | ○ | ○ |

○: Loss change at a time of separation is 1 dB or less.
Δ: Loss change at a time of separation is 1 dB or larger (separation is possible).
X: separation is impossible.

As being understood from Table 1, in any optical fibers, and in any tools, changes in transmission loss are 1 dB or less. Thus degradation of transmission properties is suppressed. Further in any case, the work of intermediate post-branching can be easily carried out.

Table 2 summarizes measurement results in which transmission loss change in a case where the separated optical fiber ribbons 1A or 1B is further separated into optical fiber ribbons each including a single optical fiber is measured. Table 2 shows three cases, one is related to a case where a wire rod of 0.2 mm in diameter is used, another is related to a case where a tool with a file is used, and the other is related to a case where a tool for realizing branching by means of a projection is used.

TABLE 2

Loss change at a time of separation
4 cores -> single core

| TYPE OF OPTICAL FIBER APPLIED TO RIBBON | TOOL FOR SEPARATION | | |
|---|---|---|---|
| | TOOL USING WIRE ROD | TOOL WITH FILE | TOOL USING A PLURALITY OF SMALL PROJECTIONS |
| SMF | Δ | Δ | Δ |
| SR10 equivalence | ○ | ○ | ○ |

○: Loss change at a time of separation is 1 dB or less.
Δ: Loss change at a time of separation is 1 dB or larger (separation is possible).
X: separation is impossible.

As being understood from Table 2, in a case where the optical fiber of SMF is used, change in transmission loss is 1 dB or larger even if any tools are used, but separation is possible. In a case where the optical fiber of the SR equivalence is used, as change in transmission loss is 1 dB or less even if any tools are used, degradation of transmission properties induced by bending is sufficiently suppressed and further the work of intermediate post-branching can be very easily carried out.

The optical fiber ribbon 1 provides the following effects. More specifically, as it has a concavity including slits having a proper length A, bending of the optical fibers is suppressed when a tool for branching is inserted into any of the slits, thereby suppressing increase in transmission loss. By moving the tool along the concavity, the concavity splits and thus the optical fiber ribbon 1 easily becomes capable of branching.

The blanket sheath 5 can be produced only from one layer of a resin. This leads to a possibility for production of a very thin optical fiber ribbon 1 can be produced. A very thin optical fiber ribbon 1 is not only space-saving but also does facilitate the work of branching.

Because the optical fiber ribbon 1 has a structure or shape similar to that of a conventional multi-core optical fiber ribbon, it can be used compatibly with the conventional multi-core optical fiber ribbon, apart from differences in properties such as easiness of branching.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

An optical fiber ribbon which is readily made to branch by means of versatile tools with suppressing transmission loss by bending and a method for making the optical fiber ribbon branch are provided.

The invention claimed is:
1. An optical fiber ribbon capable of branching by a tool having a width (X), the optical fiber ribbon comprising:
a plurality of optical fibers running in parallel, each of the optical fibers having an allowable radius of curvature;
a blanket sheath totally covering the plurality of the optical fibers;

one or more concavities formed at one or more intermediates among the optical fibers; and slits respectively arranged in series at a regular interval along the concavities, the slits penetrating the blanket sheath and allowing the tool to be inserted and the blanket sheath to split by movement of the tool along the concavities, each of the slits having a length prior to insertion of the tool so determined that flexures of the optical fibers induced by the tool widening the slits do not exceed the allowable radius of curvature, wherein each of the optical fibers has an outer diameter (D), the blanket sheath has a thickness (t1) from the respective optical fibers to a surface, each of the concavities has a thickness (t2) and a length (A), and the allowable radius of curvature (R) and the intervals (B) satisfy:

$$Y \leq A < 500 \text{ mm},$$
$$Y < A + B \leq 500 \text{ mm}$$
$$0.01 \leq A/(A+B) < 1$$
$$0 < t2 < D + 2t1, \text{ and}$$
$$Y = 2\sqrt{R^2 - \left\{R - \left(\frac{X}{2}\right)\right\}^2},$$

where Y is a lower limit length of the slits.

2. The optical fiber ribbon of claim 1, wherein the allowable radius of curvature (R) is 30 mm.

3. The optical fiber ribbon of claim 1, wherein the thickness (t1) satisfies 0<t1<0.025 mm.

* * * * *